United States Patent Office 3,557,116
Patented Jan. 19, 1971

3,557,116
2 - HALOGENO-10(OR 11) - HYDROXY - 11(OR 10)-
PIPERAZINYL DIBENZOCYCLOHEPTADIENE
DERIVATIVES
Jean Clement Louis Fouche, Bourg-la-Reine, and André
Leger, Massy, France, assignors to Rhone-Poulenc
S.A., Paris, France, a French body corporate
No Drawing. Filed Nov. 19, 1968, Ser. No. 777,156
Claims priority, application France, Nov. 20, 1967,
128,882/67
Int. Cl. C07d 51/70
U.S. Cl. 260—268                                    6 Claims

ABSTRACT OF THE DISCLOSURE

The invention provides new 2-halogeno-10(or 11)-hydroxy - 11 - (or 10)-piperazinyl - dibenzo[a,d]cycloheptadienes and their salts which are useful as neuroleptics, sedatives, tranquillizers, analgesics, anti-emetics, antidepressants, and antiserotonin agents.

---

This invention relates to dibenzo cycloheptadiene derivatives and their preparation.

The present invention provides as new compounds, the dibenzo[a,d]cycloheptadiene derivatives of the formula:

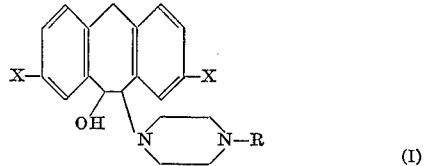

and their acid addition and quaternary ammonium salts, in which one of the symbols X represents a hydrogen atom and the other represents a halogen atom, especially chlorine, and R represents an alkyl or phenylalkyl radical in which the alkyl radicals are of 1 to 4 carbon atoms.

These dibenzo[a,d]cycloheptadiene derivatives of the Formula I are prepared by reduction of a dibenzo[a,d] cycloheptadiene derivative of the formula:

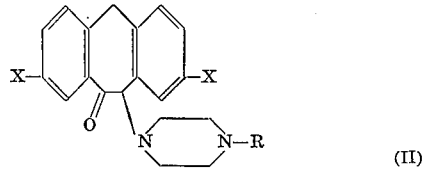

in which X and R are as previously defined, by any method of reducing a ketone group to a secondary alcohol group without reducing the multiple bonds between the carbon atoms.

As reducing agent, it is advantageous to employ an excess of potassium or sodium borohydride and to operate in an aqueous alcoholic mixture, the alcoholic portion consisting of a primary alcohol miscible with water.

The compounds of the Formula II may be prepared by the action of a dibenzo[a,d]cycloheptadiene derivative of the formula:

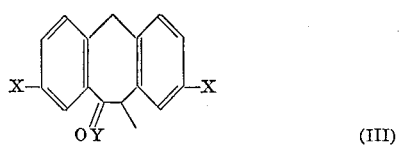

in which X is as previously defined and Y represents a reactive ester residue on a piperazine of the formula:

in which R is as previously defined. It is advantageous to carry out the operation in an inert organic solvent such as an aromatic hydrocarbon, preferably at the boiling temperature of the solvent, and to use as condensing agent an excess of the piperazine of Formula IV.

The compounds of Formula I may optionally be purified by physical methods (such as distillation, crystallisation, or chromatography) or by chemical methods (such as formation of salts, crystallisation of the latter, and their subsequent decomposition in an alkaline medium). In these operations, the nature of the anion of the salt is immaterial, the only condition being that the salt should be well-defined and readily crystallisable.

The compounds of Formula I may be converted into acid addition and quaternary ammonium salts. The addition salts may be obtained by the action of the bases with acids in appropriate solvents. Alcohols, ethers, ketones, and chlorinated solvents are, for example, suitable organic solvents. The salt formed precipitates, after concentration of its solution where appropriate, and is separated by filtration or decantation. The quaternary ammonium salts may be obtained by reaction of the bases with reactive esters, optionally in an organic solvent, at ambient temperature or more rapidly with moderate heating.

The compounds of Formula I and their acid addition and quaternary ammonium salts, have interesting pharmacodynamic properties: they are very active as neuroleptics, sedatives, tranquillisers, analgesics, antiemetics, antidepressants and antiserotonin agents. The compounds in which one of the Xs represents a chlorine atom and R represents a methyl or benzyl radical are particularly interesting.

In the usual tests, the compounds according to the invention exhibit neuroleptic activity in the rat in oral doses of 5 to 100 mg./kg. and a sedative and tranquillising activity in the mouse in oral doses of 1 to 50 mg./kg. They exhibit analgesic activity in the mouse when orally administered in doses of 1 to 50 mg./kg. They exhibit an antiemetic activity in the dog when orally administered in doses of 0.01 to 5 mg./kg. They exhibit an antidepressant activity in the rat when orally administered in doses of 10 to 100 mg./kg. They exhibit an antiserotonin activity in the guinea pig when orally administered in doses of 0.001 to 0.5 mg./kg.

For medicinal use, the new compounds are employed either as bases or as pharmaceutically acceptable acid addition or quaternary ammonium salts, i.e. salts which are not toxic in the doses in which they are employed. At examples of pharmaceutically acceptable acid addition salts, there may be mentioned salts of inorganic acids (such as hydrochlorides, sulphates, nitrates, or phosphates) and of organic acids (such as acetates, propionates, succinates, benzoates, fumarates, maleates, tartrates, theophyllineacetates, salicylates, phenophthalinates, or methylene-bis-β-hydroxynaphthoates) or of substituted derivatives of these acids.

As examples of pharmaceutically acceptable quaternary ammonium salts, there may be mentioned derivates of inorganic or organic esters such as the methochlorides, methobromides, methiodides, the ethochlorides, ethobromides, ethiodides, the allylchlorides, allylbromides, or allyliodides, or the benzylchlorides, benzylbromides, or benzyliodides, the methylsulphates or ethylsulphates, the benzenesulphonates or substituted derivatives of these compounds.

The following examples illustrate the invention. The numbering of the compounds employed in these examples is as shown in the following formulae:

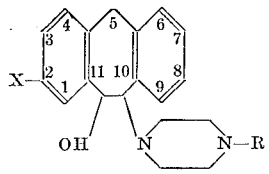 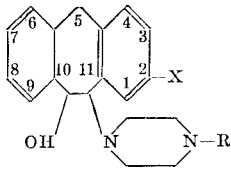

where X is a halogen atom.

EXAMPLE 1

A solution of 11.3 g. of 2-chloro-10-oxo-11-(4-methyl-1-piperazinyl)dibenzo[a,d]cycloheptadiene in 200 cc. of methanol is treated with 1.8 g. of potassium borohydride in solution in 55 cc. of distilled water. After stirring for 17 hours at 25° C., the greater part of the methanol is evaporated under reduced pressure (20 mm. Hg). The residue is taken up in 150 cc. of distilled water and the product in suspension is twice extracted with a total of 310 cc. of methylene chloride. The combined organic solutions are extracted 3 times with a total of 250 cc. of an ice-cold N aqueous methanesulphonic acid solution. The combined aqueous acid solutions are made alkaline with 90 cc. of 5 N sodium hydroxide. The oil which appears is extracted 3 times with a total of 300 cc. of methylene chloride. The combined organic solutions are washed 3 times with a total of 120 cc. of distilled water, dried over anhydrous sodium sulphate, and evaporated. The residue obtained is dissolved in 120 cc. of boiling acetonitrile. After cooling for 3 hours at 3° C., the crystals which have appeared are separated, twice washed with a total of 10 cc. of ice-cold acetonitrile, and then dried under reduced pressure (20 mm. Hg). 7.1 g. of 2-chloro-10-hydroxy-11-(4-methyl-1-piperazinyl)dibenzo[a,d]cycloheptadiene, M.P. 184° C., are obtained.

The starting 2-chloro-10-oxo-11-(4-methyl-1-piperazinyl)dibenzo[a,d]cycloheptadiene may be prepared as follows:

Preparation of 2-formyl-5-chlorobenzoic acid (M.P. 140° C.) by the method of Vaughan et al., J. Amer. Chem. Soc. 68, 1314 (1946).

Preparation of 97.4 g. of 3-phenyl-6-chlorophthalide (M.P. 93.5–94.5° C.) by the action of phenylmagnesium bromide in tetrahydrofuran on 101.2 g. of 2-formyl-5-chlorobenzoic acid.

Preparation of 33.4 g. of 2-benzyl-5-chlorobenzoic acid (M.P. 128–129° C.) by reduction of 37.2 g. of 3-phenyl-6-chlorophthalide with zinc powder in ammoniacal medium.

Preparation of 122.2 g. of methyl 2-benzyl-5-chlorobenzoate (B.P. 155–157.5° C./0.2 mm. Hg) by the action of methanol under reflux in the presence of sulphuric acid on 125 g. of 2-benzyl-5-chlorobenzoic acid.

Preparation of 101.7 g. of 2-benzyl-5-chlorobenzyl alcohol (B.P. 146–148° C./0.15 mm. Hg) by reduction of 122 g. of methyl 2-benzyl-5-chlorobenzoate with lithium-aluminium hydride.

Preparation of 119.7 g. of 2-benzyl-5-chlorobenzyl bromide (B.P. 139–142.5° C./0.3 mm. Hg; M.P. 52° C.) by the action of 48% aqueous hydrobromic acid under reflux on 101.5 g. of 2-benzyl-5-chlorobenzyl alcohol.

Preparation of 89.2 g. of (2-benzyl-5-chlorophenyl) acetonitrile (B.P. 141–143° C./0.25 mm. Hg; M.P. 35° C.) by the action of potassium cyanide, in aqueous ethanolic medium under reflux, on 19.2 g. of 2-benzyl-5-chlorobenzyl bromide.

Preparation of 86.0 g. of (2-benzyl-5-chlorophenyl) acetic acid (M.P. 114.5–116° C.) by hydrolysis of 89.1 g. of (2-benzyl-5-chlorophenyl)acetonitrile in aqueous ethanolic medium, under reflux in the presence of potassium hydroxide.

Preparation of 48.6 g. of 2-chloro-10-oxo-dibenzo[a,d] cycloheptadiene by heating 62.2 g. of (2-benzyl-5-chlorophenyl)acetic acid for 5 hours at 130–135° C. in polyphosphoric acid.

Preparation of 48.7 g. of 2-chloro-10-oxo-11-bromodibenzo[a,d]cycloheptadiene (M.P. 124–125° C.) by the action of a slight excess of bromine on 43.6 g. of 2-chloro-10-oxo-dibenzo[a,d]cycloheptadiene in carbon tetrachloride.

Preparation of 19 g. of 2-chloro-10-oxo-11-(4-methyl-1-piperazinyl)dibenzo[a,d]cycloheptadiene dihydrochloride (M.P. 220–222° C.) by the action of an excess of 1-methylpiperazine on 24.1 g. of 2-chloro-10-oxo-11-bromo-dibenzo[a,d]cycloheptadiene in benzene at ambient temperature.

EXAMPLE 2

A suspension of 7.5 g. of 2-chloro-10-oxo-11-(4-benzyl-1-piperazinyl)-dibenzo[a,d]cycloheptadiene in 200 cc. of methanol is treated with 2.5 g. of sodium borohydride. After stirring for 17 hours at 25° C., the solution is partially evaporated under reduced pressure (20 mm. Hg). The residue is taken up in 400 cc. of distilled water and 20 cc. of sodium hydroxide solution, and the oil which appears is twice extracted with a total of 400 cc. of diethyl ether. The combined ethereal solutions are twice washed with a total of 400 cc. of distilled water and then twice extracted with a total of 200 cc. of ice-cold aqueous N methanesulphonic acid solution. The acid extracts are combined and made alkaline with 40 cc. of sodium hydroxide solution. The oil which apepars is extracted with 50 cc. of methylene chloride and then twice with a total of 200 cc. of diethyl ether. The combined organic solutions are dried over potassium carbonate and then evaporated, and the residue obtained (7.5 g.) is dissolved in 30 cc. of anhydrous ethanol, the solution is added to a mixture of 10 cc. of a 3.7 N hydrogen chloride in diethyl ether and 20 cc. of anhydrous ethanol, and 30 cc. of anhydrous diethyl ether are added after the crystallization has been initiated. After standing for one hour, the crystals which have appeared are separated, washed with 20 cc. of an hydrous mixture of ethanol and diethyl ether (1:1 by volume) and then with 20 cc. of anhydrous diethyl ether and dried under reduced pressure (20 mm. Hg). 7.8 g. of 2-chloro-10-hydroxy-11(4-benzyl - 1 - piperazinyl)dibenzo[a,d]cycloheptadiene dihydrochloride, M.P. 245–248° C., are obtained.

16.2 g. of 2-chloro-10-oxo-11-(4-benzyl-1-piperazinyl)-dibenzo[a,d]cycloheptadiene (M.P. 148° C.) are prepared by the action of an excess of 1-benzylpiperazine in benzene at ambient temperature on 28.2 g. of 2-chloro-10-oxo-11-bromodibenzo[a,d]cycloheptadiene prepared as in Example 1.

EXAMPLE 3

A solution of 8.3 g. of 2-chloro-11-oxo-10-(4-methyl-1-piperazinyl)-dibenzo[a,d]cycloheptadiene in 160 cc. of methanol is treated with 1.3 g. of potassium borohydride in solution in 40 cc. of distilled water. After stirring for 17 hours at 25° C., the suspension obtained is cooled to 3° C. The crystals are separated, washed with distilled water and then dissolved in 80 cc. of ice-cold 2 N aqueous methanesulphonic acid solution. The aqueous acid solution is twice washed with a total of 100 cc. of diethyl ether and then made alkaline with 100 cc. of 2 N sodium hydroxide. The precipitate which appears is extracted 3 times with a total of 300 cc. of methylene chloride. The combined organic solutions are washed 3 times with a total of 150 cc. of distilled water, dried over anhydrous sodium sulphate and evaporated, and the product obtained (6.4 g.; M.P. 187–189° C.) is dissolved in 200 cc. of boiling acetonitrile. After cooling for 3 hours at 3° C., the crystals which have appeared are separated, twice washed with a total of 30 cc. of ice-cold acetonitrile and dried under reduced pressure (20 mm. Hg). 5.1 g. of 2-chloro-11-hydroxy - 10-(4-methyl-1-piperazinyl)dibenzo[a,d]cycloheptadiene, M.P. 190–191° C., are obtained.

The starting 2-chloro - 11 - oxo-10-(4-methyl-1-piperazinyl)-dibenzo[a,d]cycloheptadiene may be prepared as follows:

Preparation of 2-chloro-11-oxo-dibenzo[a,d]cycloheptadiene in accordance with Example 2 of French Pat. No. 1,498,259.

Preparation of 41.4 g. of 2-chloro-10-bromo-11-oxo-dibenzo[a,d]cycloheptadiene (M.P. 104° C.) by the action of a slight excess of bromine on 41.2 g. of 2-chloro-11-oxo-dibenzo[a,d]cycloheptadiene in carbon tetrachloride.

Preparation of 11.3 g. of 2-chloro-11-oxo-10-(4-methyl-1 - piperazinyl)dibenzo[a,d]cycloheptadiene dihydrochloride (M.P. 235–240° C.) by the action of an excess of 1-methylpiperazine on 18.1 g. of 2-chloro-10-bromo-11-oxo-dibenzo[a,d]cycloheptadiene in benzene at ambient temperature.

EXAMPLE 4

A solution of 17.8 g. of 2-chloro-11-oxo-10-(4-benzyl-1-piperazinyl)dibenzo[a,d]cycloheptadiene in 450 cc. of methanol is treated with 5.9 g. of sodium borohydride. After stirring for 17 hours at 25° C. the solution is partially evaporated and then treated with 500 cc. of distilled water. The oil which has appeared is twice extracted with a total of 250 cc. of diethyl ether, and the combined ethereal solutions are washed 6 times with a total of 300 cc. of distilled water and then twice extracted with a total of 150 cc. of ice-cold 2 N aqueous methanesulphonic acid solution. The combined acid extracts are made alkaline with 90 cc. of 5 N sodium hydroxide, and the oil which appears is extracted 3 times with a total of 300 cc. of diethyl ether. The combined ethereal solutions are twice washed with a total of 100 cc. of distilled water, dried over anhydrous sodium sulphate, and evaporated. The residue obtained (14.4 g.) is dissolved in 50 cc. of ethanol, and the solution is added to 20.8 cc. of a 3.6 N hydrogen chloride in diethyl ether. After the addition of 10 cc. of ethanol and of 3 cc. of distilled water, followed by cooling at 3° C. for 4 hours, the crystals which have appeared are separated, washed with 5 cc. of ethanol and then twice with a total of 10 cc. of anhydrous diethyl ether, and dried under reduced pressure (20 mm. Hg). 14.7 g. of hydrated 2-chloro - 11-hydroxy-10-(4-benzyl-1-piperazinyl)dibenzo[a,d]cycloheptadiene dihydrochloride, M.P. 216–218° C., are obtained.

23.7 g. of 2-chloro-11-oxo-10-(4-benzyl-1-piperazinyl)-dibenzo[a,d]cycloheptadiene dihydrochloride (M.P. 190° C.) are prepared by the action of an excess of 4-benzyl-piperazine in benzene at ambient temperature on 21.1 g. of 2-chloro - 10-bromo-11-oxo-dibenzo[a,d]cycloheptadiene prepared as in Example 3.

The invention includes within its scope pharmaceutical compositions comprising in association with a compatible pharmaceutically acceptable carrier or coating, at least one dibenzo[a,d]cycloheptadiene of Formula I or a non-toxic acid addition or quaternary ammonium salt thereof. These compositions may be in a form suitable for oral, parenteral or rectal administration, and the proportion of the active ingredient may be from 0.5 to 95% by weight.

Solid compositions for oral administration include tablets, pills, powders or granules. In such solid compositions, the active ingredient is mixed with one or more inert diluents such as sucrose, lactose or starch. These compositions may also contain, as is normal practice, substances other than diluents, for example a lubricant, such as magnesium stearate.

Liquid compositions for oral administration include pharmaceutically acceptable emulsions, solutions, suspensions, syrups, and elixirs, containing inert diluents, such as water or liquid paraffin. These compositions may also include substances other than diluents, for example wetting agents, sweeteners, flavours, perfumes, and preservatives.

The compositions according to the invention for parenteral administration may be aqueous or non-aqueous sterile solutions, suspensions, or emulsions. Suitable solvents or vehicles include propylene glycol, polyethylene glycol, vegetable oils, more particularly olive oil, and injectable organic esters, for example ethyl oleate. These compositions may also contain adjuvants, more particularly wetting agents, emulsifiers, and dispersing agents. Sterilisation may be effected in various ways, for example, with a bacteriological filter, by incorporating sterilising agents in the composition, by irradiation, or by heating. The compositions may also be prepared in the form of sterile solid compositions which may be dissolved at the time of use in sterile water or in any other injectable sterile medium.

The compositions for rectal administration are suppositories which contain, in addition to the active compound, excipients such as cacao butter or suppository wax.

The dose used depends upon the desired therapeutic effect, the route of administration, and the duration of treatment. When orally administered to man, a dose from 2 to 500 mg. of active product per day for an adult is generally suitable.

The following are examples of pharmaceutical compositions in accordance with the invention.

EXAMPLE 5

Tablets having the following composition are prepared by the usual technique:

| | Mg. |
|---|---|
| 2 - chloro-10-hydroxy-11-(-4-methyl-1-piperazinyl)-dibenzo[a,d]cycloheptadiene | 5 |
| Starch | 110 |
| Colloidal silica | 32 |
| Magnesium stearate | 3 |

EXAMPLE 6

Tablets having the following composition are prepared by the usual technique:

| | Mg. |
|---|---|
| 2 - chloro - 10-hydroxy-11-(4-methyl-1-piperazinyl)-dibenzo[a,d]cycloheptadiene | 25 |
| Starch | 92 |
| Colloidal silica | 30 |
| Magnesium stearate | 3 |

We claim:
1. A dibenzo[a,d]cycloheptadiene of the formula:

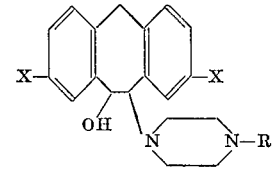

and its non-toxic acid addition salts, in which one of the symbols X represents a hydrogen atom and the other a halogen atom and R represents alkyl of 1 to 4 carbon atoms or phenylalkyl in which the alkyl is of 1 to 4 carbon atoms.

2. A dibenzo[a,d]cycloheptadiene as claimed in claim 8 and its non-toxic acid addition salts in which one of the symbols X is hydrogen and the other is chlorine.

3. 2 - chloro - 10-hydroxy-11-(4-methyl-1-piperazinyl)

dibenzo[a,d]cycloheptadiene and its non-toxic acid addition salts.

4. 2 - chloro - 10-hydroxy-11-(4-benzyl-1-piperazinyl) dibenzo[a,d]cycloheptadiene and its non-toxic acid addition salts.

5. 2 - chloro - 11-hydroxy-10-(4-methyl-1-piperazinyl) dibenzo[a,d]cycloheptadiene and its non-toxic acid addition salts.

6. 2 - chloro - 11-hydroxy-10-(4-benzyl-1-piperazinyl) dibenzo[a,d]cycloheptadiene and its non-toxic acid addition salts.

References Cited

UNITED STATES PATENTS

| | | | |
|---|---|---|---|
| 3,478,048 | 11/1969 | Edenhoren | 260—268X |
| 3,496,182 | 2/1970 | Fouche et al. | 260—268 |

DONALD G. DAUS, Primary Examiner

U.S. Cl. X.R.

260—465, 476, 515, 521, 590, 618; 424—250